(12) United States Patent
Shiomoto et al.

(10) Patent No.: US 6,584,120 B1
(45) Date of Patent: Jun. 24, 2003

(54) DATA MULTIPLEXING APPARATUS AND METHOD

(75) Inventors: Shoji Shiomoto, Tokyo (JP); Mamoru Kugumiya, Chiba (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/315,746

(22) Filed: May 20, 1999

(30) Foreign Application Priority Data

May 28, 1998 (JP) .......................................... 10-148139

(51) Int. Cl.[7] .................................................. H04J 3/24
(52) U.S. Cl. ................. 370/473; 370/395.4; 370/395.6; 370/503; 348/423.1; 348/518
(58) Field of Search ................................. 370/503, 464, 370/465, 469, 474, 473, 395.4, 395.6; 348/518, 519, 512, 500, 473, 467, 474, 464, 461, 411.1, 412.1, 413.1, 414.1, 415.1, 423.1

(56) References Cited

U.S. PATENT DOCUMENTS 5,138,440 A * 8/1992 Radice ........................ 348/472
5,287,182 A * 2/1994 Haskell et al. .............. 348/500
5,537,408 A * 7/1996 Branstad et al. ............ 370/473

FOREIGN PATENT DOCUMENTS

EP          0 84108200 A2    5/1998

* cited by examiner

*Primary Examiner*—William A. Luther
(74) *Attorney, Agent, or Firm*—Bell, Boyd & Lloyd LLC

(57) ABSTRACT

In a multiplexer, a channel selection controller determines which channel code is to be selected for a control data generator, each of multiplex buffers, and null packet generator, a PTS/DTS controller replaces PTS with DTS in a program being multiplexed, an output controller reads and deliver TS at a time synchronous with a system clock, and a virtual decoder buffer simulates each of T-STD buffers as in MPEG2.

16 Claims, 15 Drawing Sheets

DATA MULTIPLEXING APPARATUS AND METHOD

BACKGROUND OF THE INVENTION

1. Field of the Invention

The present invention relates to a data multiplexing apparatus and method for assembling a plurality of programs of coded video and audio data into packets and multiplexing the packets into a single bit stream.

2. Description of Related Art

Recently, the digital satellite broadcasting systems have been prevailing in which a transmitting side uses the techniques of information compression and multiplexing as in the MPEG (Moving Picture coding Experts Group) 2 or the like to code and multiplex a plurality of programs of quality video and audio information into a single bit stream within in a limited transmission band and transmit the bit stream to a receiving side which disassembles and decode the received bit stream.

At the transmitting side, the video and audio information is coded as in the MPEG2, the digital coded data is multiplexed into a bit stream, the bit stream is subjected to an error correction and modulation, and then transmitted towards a communication satellite from a transmission antenna.

The multiplexer used at the transmitting side is configured as schematically shown in FIG. 1. Briefly, the multiplexer disassembles an elementary stream packetized by an encoder provided upstream thereof, namely, a packetized elementary stream (will be referred to as "PES" hereinunder) 101 into transport packets in relatively short transmission units of 188 bytes, and connects a plurality of transport packets by time-division multiplexing to provide a transport stream (will be referred to as "TS" hereinunder) 120.

Three PES streams 101, for example, supplied from three encoders are stored into an input controller 103. The input controller 103 supplies three multiplex buffers $102_1$, $102_2$ and $102_3$ with three input PES streams 101, respectively, acquire information of PES headers and ES headers of video and audio data, and supplies a channel selection controller 116 with a synchronization control information.

The multiplex buffers $102_1$, $102_2$ and $102_3$ are each of an FIFO type to provisionally store three PES streams 101, respectively. In these multiplex buffers $102_1$, $102_2$ and $102_3$, the three PES streams 101 are packetized as transport packets (will be referred to as "TP" hereinunder) and kept there until they are multiplexed.

The multiplexer includes also a control data generator 105 which generates and packetizes program specific information (will be referred to as "PSI" hereinunder) necessary for selection and decoding of a program at the receiving side and service information (will be referred to as "SI" hereinunder) on the whole or a part of a program. In some cases, the control data generator 105 uses a system time generated from a basic clock inside the multiplexer to generate a program clock reference (will be referred to as "PCR" hereinunder) peculiar to each program and which is used as a reference. A transmission period is managed for each control data, a multiplex request for each control data is sent to the channel selection controller 113 at a time when a control data has to be transmitted while a TP packets for the control data are kept in an output register included in the control data generator 105

The multiplexer further includes a null packet generator 106 which generates, at a time when it is not necessary to multiplex the PES and control data, a TP packet as a code which is meaningless as a data but fills voids in the bit stream.

A TP header generator 109 is also provided in the multiplexer to generate a TP header which has to be multiplexed before the three PES streams 101 are read from the multiplex buffers $102_1$ $102_2$ and $102_3$ for multiplexing.

The channel selection controller 113 determines which code should be selected for one of the channels to the control data generator 105, multiplex buffers $102_1$, $102_2$ and $102_3$ and null packet generator 106, and sends a selection signal to a switch 114 to control the multiplex channels. When any one of the multiplex buffers $102_1$, $102_2$ and $102_3$ is selected, the switch 114 is controlled to read from the TP header generator 109 before reading from the multiplex buffers $102_1$, $102_2$ and $102_3$. For reading from the TP header generator 109, the switch 114 is provided with a one of parameters stated in the TP header and which varies depending upon a channel over which the reading is to be done and a timing at which the reading is to be done. The parameters thus delivered to the switch 114 include a packet ID (will be referred to as "PID" hereinunder), adaptation field control signal, etc. A code multiplexed by the switch 114 is delivered as a TP code to a presentation time stamp (will be referred to as "PTS" hereinunder)/decoding time stamp (will be referred to as "DTS" hereinunder) controller 116 also included in the multiplexer.

The PTS/DTS controller 116 swaps a PTS and DTS of a program being multiplexing between them when the PTS and DTS are not suitable for the PCR for the program, and sends it to an output controller 119 also included in the multiplexer. For example, when a PCR is generated from a value of a system time the multiplexer has, the input controller 103 acquires an elementary stream clock reference (will be referred to as "ESCR" hereinunder) along with a PTS and DTS, clarifies the topological relation with the ESCR, and replaces it with the PTS and DTS having a correct topological relation with a PCR which is actually sent.

The output controller 119 reads and delivers a TS stream 120 at a time based on the system clock the multiplexer has.

The TS stream 120 should be a bit stream with which all code buffers the decoders have can operate successfully or without failure. Normally, the encoder to implement the coding as in the MPEG2 generates a bit stream with which all the buffers in a transport stream system target decoder (will be referred to as "T-STD" hereinunder) can work without failure.

However, in the multiplexer shown in FIG. 1, namely, in the multiplexer disassembling a PES stream 101 into TP packets in relatively short transmission units of 188 bytes, and connecting a plurality of TP packets by time-division multiplexing to provide a TS 120, each buffer of the T-STD is not completely assured for normal operation. If the delay in a multiplex buffer 102 for a certain channel, for example, is larger for any reason, the virtual buffer in the T-STD is likely to fail.

If a code topological relation an input stream inherently has and which is appropriate for the synchronization control is broken when the content of the input stream is subjected to some bit manipulation such as invalid code removal, etc., the above-mentioned method cannot assure the normal operation of the virtual buffer of the T-STD.

SUMMARY OF THE INVENTION

Also, when a certain integrated receiver decoder (IRD) is used to simulate each buffer of the T-STD by an IRD for actual operation of the buffer at the transmitting side, it is difficult to have the buffer operate as specified for a memory configuration, inter-memory transfer rate and inter-memory transfer delay.

Accordingly, the present invention has an object to overcome the above-mentioned drawbacks of the prior art by providing a multiplexing apparatus and method adapted to assure the normal operation of decoder and code buffer and normal reproduction of decoder.

The above object can be attained by providing a data multiplexer for multiplexing a number n of coded stream data, comprising, according to the present invention:

a number n of means for provisionally storing the number n of coded stream data;

a selection controlling means for retrieving a data occupancy in the number 17 of storage means to select any one of the storage means;

means for switching and delivering the coded stream data from the storage means selected by the selection controlling means;

an output means for multiplexing the switched output from the switching means; and a virtual storage means for simulating the write and read, for decoding, of the multiplexed bit stream from the output means into and from the code buffer.

In this multiplexer, the selection controlling means selects a data based on a data storage information from the virtual storage means.

Also the above object can be attained by providing a data multiplexer for multiplexing a number n of coded stream data, comprising, according to the present invention:

a number n of means for provisionally storing the number n of coded stream data;

a selection controlling means for retrieving a data occupancy in the number n of storage means to select any one of the storage means;

means for switching and delivering the coded stream data from the storage means selected by the selection controlling means;

an output means for multiplexing the switched output from the switching means; and means for simulating the write and read, for decoding, of the multiplexed bit stream from the output means into and from the code buffer.

In this multiplexer, the selection controlling means selects a data based on a data storage information from the virtual storage means.

Further, the above objection can be attained by providing a data multiplexing method for multiplexing a number n of coded stream data, comprising, according to the present invention, the steps of:

retrieving the data occupancy in storage units which provisionally store the number n of means to select any one of the storage units;

switching the coded stream data from the selected storage unit to deliver a multiplexed data;

using the multiplexed data to form a multiplexed bit stream; and simulatively effecting the write and read, for decoding, of the multiplexed bit stream into and from the code buffer to control the selection of the storage units.

Also the above object can be attained by providing a data multiplexing method for multiplexing a number n of coded stream data, comprising, according to the present invention, the steps of:

retrieving the data occupancy in storage units which provisionally store the number n of means to select any one of the storage units;

switching the coded stream data from the selected storage unit to deliver a multiplexed data;

using the multiplexed data to form a multiplexed bit stream; and simulating the write and read, for decoding, of the multiplexed bit stream into and from the code buffer to control the selection of the storage units.

As mentioned above, the multiplexer according to the present invention comprises means having a virtual code buffer of decoder which is let to operate as specified or means for simulating the change of data occupancy in the code buffer of decoder as specified, and controls the multiplexing while monitoring the operation of the above means from the channel selection controller, thereby assuring the normal operation of the buffer at the decoder side.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
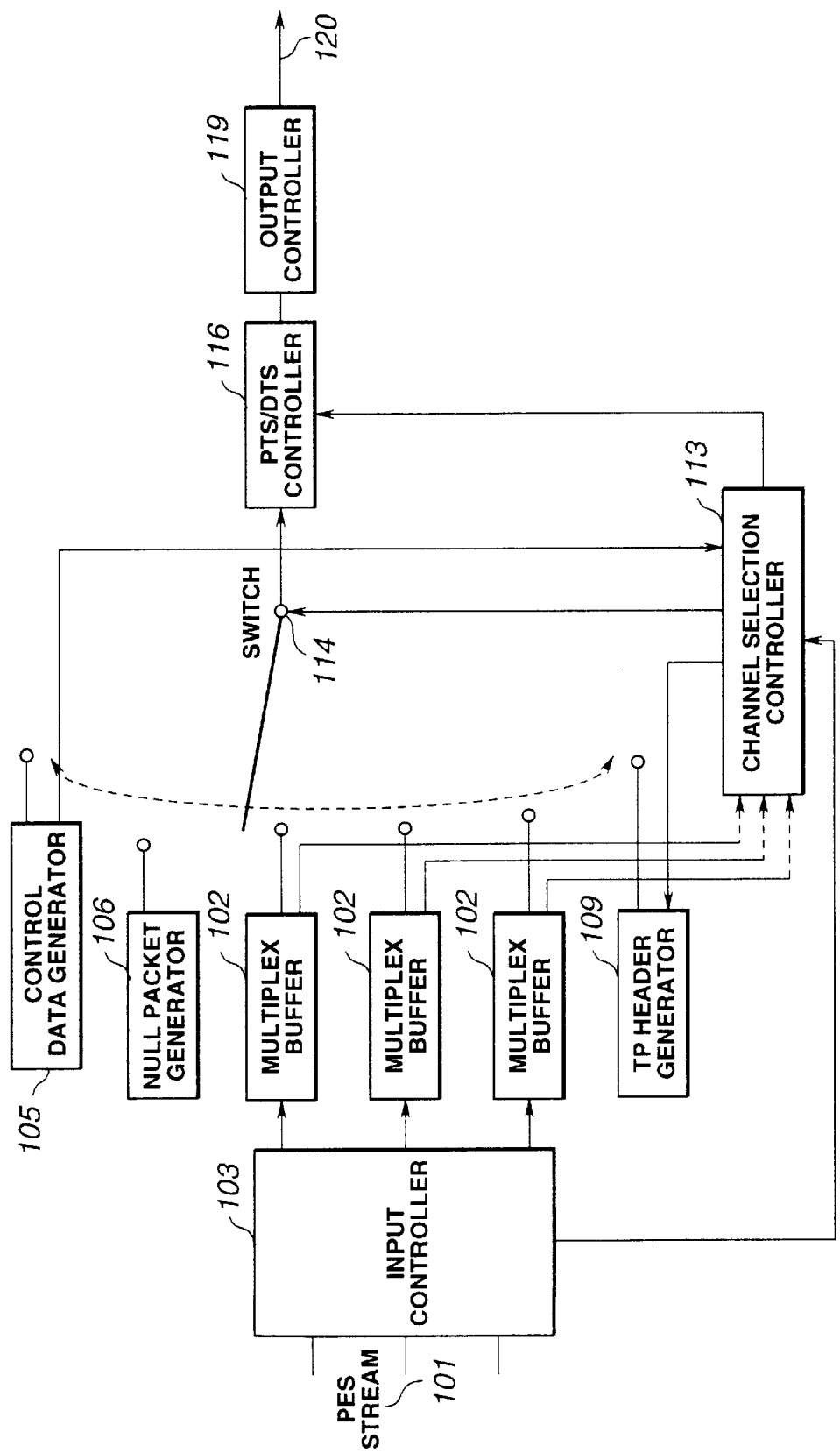
FIG. 1 is a block diagram of the conventional multiplexer.
Figure 2:
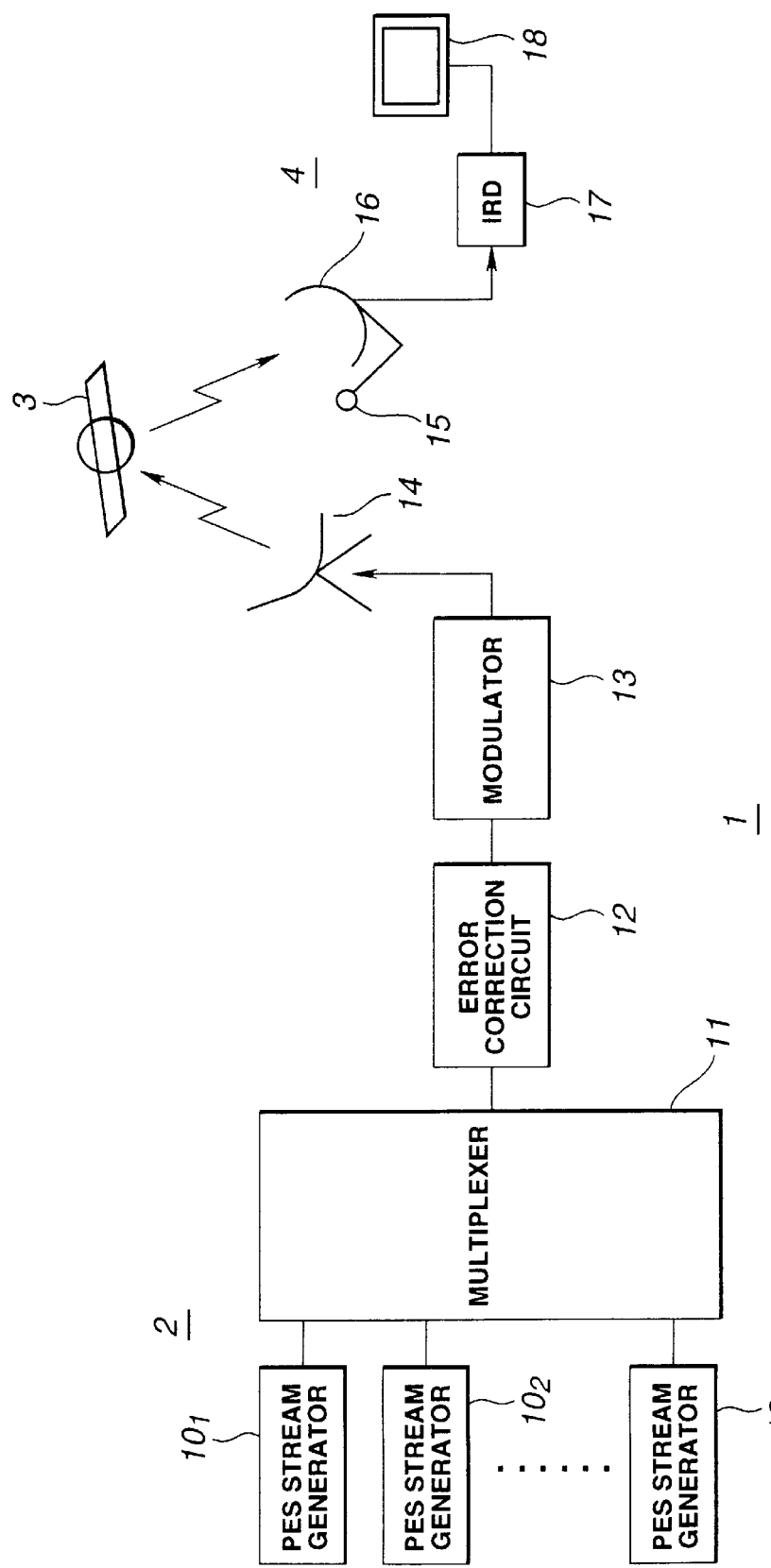
FIG. 2 is a schematic block diagram of a digital satellite broadcasting system having provided at a transmitter thereof the multiplexer according to the present invention.

Referring now to FIG. 2, there is illustrated a digital satellite broadcasting system. The digital satellite broadcasting system is generally indicated with a reference 1. The digital satellite broadcasting system 1 includes a multiplexer 11 according to the present invention.

As shown, the digital satellite broadcasting system 1 consists of a transmitter generally indicated with a reference 2, and a receiver generally indicated with a reference 4. The multiplexer 11 is provided in the transmitter 2. In this digital satellite broadcasting system 1, a transmitted signal is sent to an artificial satellite 3, received by the receiver 4 from the satellite 3 and processed into reproducible video and audio signals.

The transmitter 2 comprises a number n of packetized elementary streams (will be referred to as "PES" hereinunder) stream generators $10_1, 10_2, 10_3, \ldots, 10_n$ which adopts the information compression technique as in MPEG (Moving Picture coding Experts Group) 2 to code video and audio information and generate PES streams, a multiplexer 11 to disassemble the number n of PES streams into transport packets (will be referred to as "TP" hereinunder) in relatively short transmission units of 188 bytes, connect the TP packets by time-division multiplexing and deliver them as transport streams (will be referred to as "TS" hereinunder), an error correction circuit 12 to code TS streams for the purpose of error correction beforehand so that even if a noise is superposed on the TS streams from the multiplexer, the TS streams can be corrected into correct codes at the receiving side, a modulator 13 to digitally modulate output codes from the error correction circuit 12 with QPSK, fort example, and a transmission antenna 14.

Figure 3A:
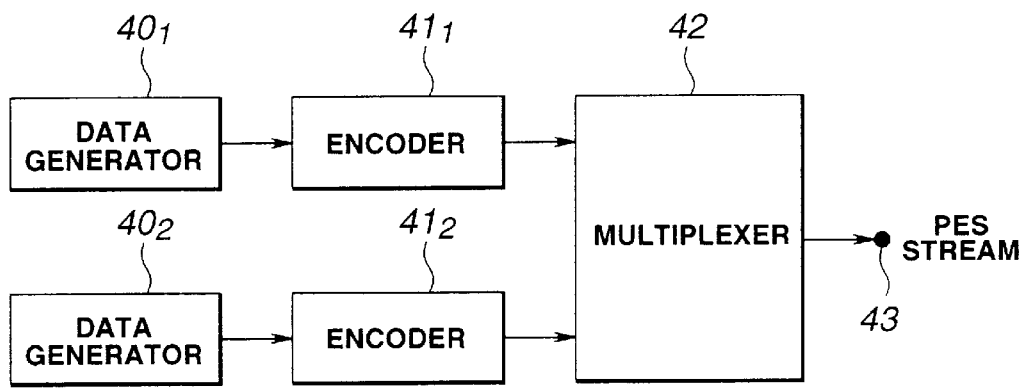
FIGS. 3A and 3B are block diagrams of a PES stream generator provided at the transmitter of the digital satellite broadcasting system in FIG. 2.
Figure 3B:
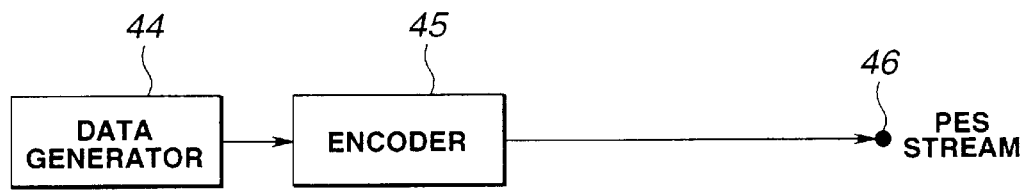

As shown in FIGS. 3A or 3B, each of the PES stream generators $10_1, 10_2, 10_3, \ldots, 10$ incorporates an encoder to compress and code video and audio information by MPEG2, for example. As shown in FIG. 3A, the PES stream generator compresses and codes, each of encoders $41_1$, and $41_2$ as in MPEG2, a video signal and audio signal from data generators $40_1$ and $40_2$ in an optical disc drive, hard disc drive, etc., for example, and multiplexes the compressed and coded signals by the multiplexer 42 into a PES stream which is delivered at an output terminal 43 thereof As shown in FIG. 3B, the PES stream generator compresses and codes a video signal from a data generator 44 by an encoder 94 as in MPEG2 and delivers the compressed and coded video signal as a PES stream.

According to MPEG2, a video signal is coded as will be described herebelow:

First, the spatial correlation of a video data is compressed using a discrete cosine transform (DCT). The compressing method using the time base-directional correlation include two techniques: In one of the techniques, a difference of a current frame from a preceding or following frame is determined and only the difference is coded to enhance the effect of compression, while the other technique uses a movement compensation in which a calculated movement of the preceding or following frame is coded. By combination of these two techniques, a high efficiency of compression can be attained. A difference of an input video signal from a signal predicted by the motion compensative prediction and intraframe prediction is calculated to provide a difference signal. The difference signal is subjected to DCT and then quantized to provide a coefficient row which will be subjected to a variable-length coding to provide a coded data output. MPEG2 specifies that the coded data output is connected to a video buffer verifier (VBV) being a T-STD which should thus operate without failure.

Thus, for coding a coded data into an elementary stream (will be referred to as "ES" hereinunder) at a good time, data which are meaningless when decoded as the case may be removed.

According to MPEG2, an audio signal is coded in a different manner from a video signal. For a high efficiency of compression, an audio frame is subjected to a fixed-length coding.

Further, each encoder packetizes ES streams of video and audio data having been compressed and coded by such a highly efficient coding at every masses of the ES streams of a certain code length to deliver them in the form of PES stream. In MPEG2, the code length of one PES stream is not specially specified and no alignment with an access unit (will be referred to as "AU" hereinunder) as a coding unit for video data is specified.

A plurality of output codes (PES streams) from the PES stream generators $10_1, 10_2, 10_3, \ldots, 10_n$ is supplied to the multiplexer 11 in which they are packetized to TP packets and delivered as TS streams. In the error correction circuit 12, the TS streams are subjected to an error correction beforehand so that they can be corrected to correct codes at the receiving side even when a noise developed during transmission is superposed on them. An output code from the error correction circuit 12 is digitally modulated by QPSK or the like in the modulator 13 for transmission from the transmission antenna 14 towards the artificial satellite 3.

Next, the receiver 4 will briefly be explained. An RF signal emitted from the artificial satellite 3 is received by a reception antenna 16, subjected to a frequency conversion to an intermediate frequency (IF signal) by a low noise block converter (LNB) 15, and supplied to an integrated receiver decoder (will be referred to as "IRD" hereinunder) 17 also called "set top box". Supplied with the IF signal, the IRD 17 demodulates and demultiplexes it into desired programs of video and audio codes, and decode them to provide video and audio signals which can be reproduced on a TV receiver 18.

In the digital broadcasting system 1 having been outlined in the foregoing, the multiplex 11 according to the present invention disassembles the number n of PES streams into transport packets (will be referred to as "TP" hereinunder) in relatively short units of 188 bytes, connect the number n of TP packets by time-division multiplexing, and delivers TS streams.

Figure 4:
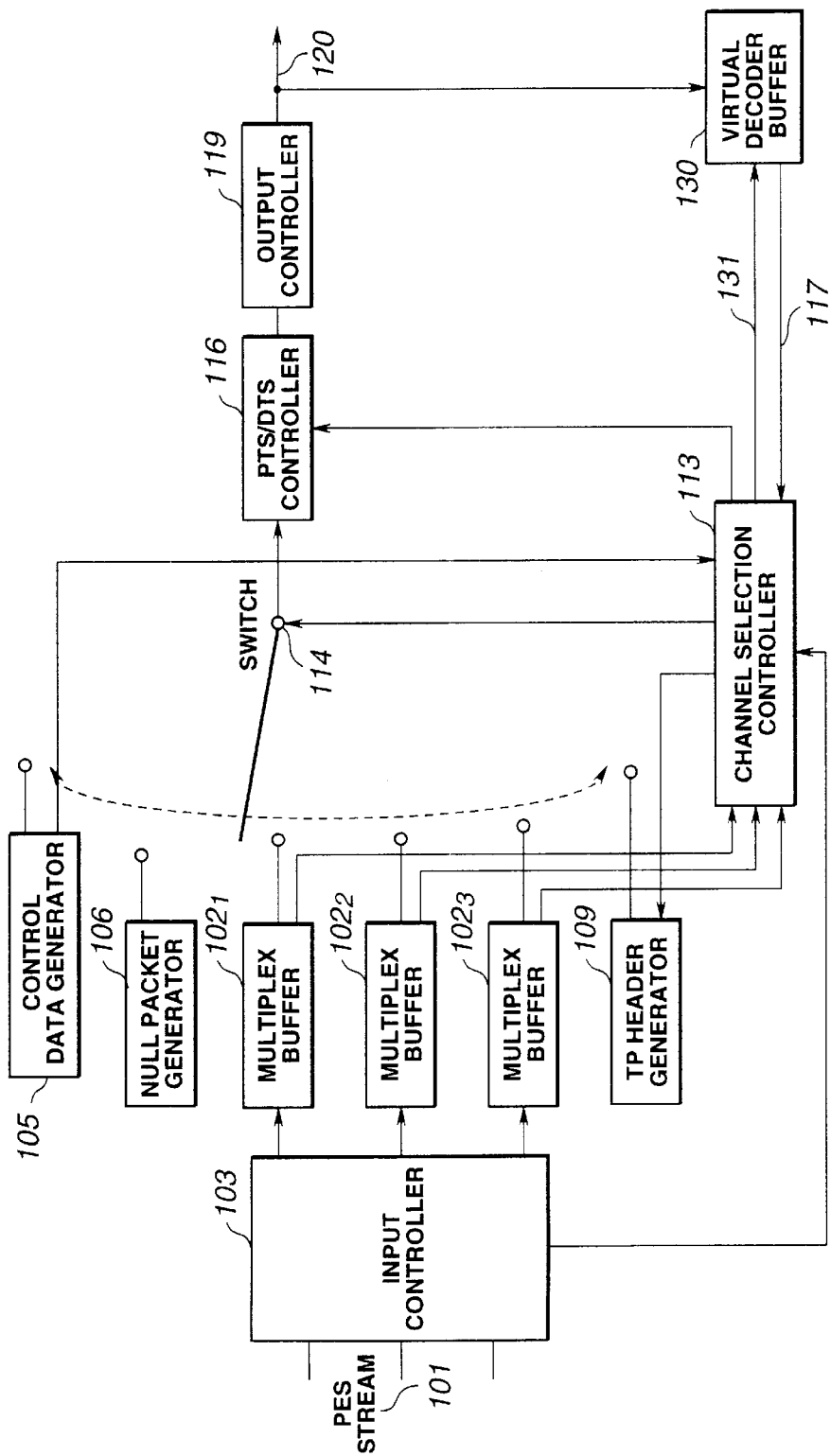
FIG. 4 is a block diagram of a first embodiment of the multiplexer according to the present invention.

First, the first embodiment of the multiplexer according to the present invention will be described below. As shown in FIG. 4, the first embodiment comprises an input controller 103 to store three PES streams 101 byte by byte, multiplex buffers $102_1$, $102_2$ and $102_3$ each of an FIFO (first-in first-out) type to provisionally store the three PES streams 101, respectively, a control data generator 105 in which information necessary for program selection and decoding at the receiving side are packetized, a null packet generator 106 which generates, at a time when it is not necessary to multiplex the PES and control data, a TP as a code fills voids in the bit stream, a TP header generator 109 to generate a necessary TP header before the three PES streams 101, a channel selection controller 113 determines which code should be selected for one of the channels to the control data generator 105, multiplex buffers $102_1$, $102_2$ and $102_3$ and null packet generator 106, a presentation time stamp (will be referred to as "PTS" hereinunder)/decoding time stamp (will be referred to as "DTS" hereinunder) controller 116 to replace the values of PTS and DTS of a program being multiplexed, an output controller 119 to read and deliver a TS stream at a time based on the system clock, and a virtual decoder buffer 130 to simulate each of code buffers of T-STD specified for the MPEG2 system.

Three PES streams supplied from the three PES stream generators shown in FIG. 2 each provided with the encoder as shown in FIG. 3 are stored byte by byte into the input controller 103. The input controller 103 will supply the three multiplex buffers $102_1$, $102_2$ and $102_3$ with the three input PES streams 101, acquire PES headers and ES header information of video and audio data, and supply the channel selection controller 116 with a synchronization control information.

The multiplex buffers $102_1$, $102_2$ and $102_3$ are of an FIFO type to provisionally store the three PES streams 101, respectively. In the multiplex buffers $102_1$, $102_2$ and $102_3$, the three PES streams are packetized into TP packets and kept there until they are multiplexed.

The control data generator 105 generates program specific information (will be referred to as "PSI" hereinunder) necessary for selection and decoding a program at the receiving side and service information (will be referred to as "SI" hereinunder) including various kinds of information on the whole or a part of the program, and packetizes them into TP packets. In some cases, the control data generator 105 uses a system time generated from a basic clock inside the multiplexer to generate a program clock reference (will be referred to as "PCR" hereinunder) peculiar to each program and which is used as a reference. A transmission period is managed for each control data, a multiplex request for each control data is sent to the channel selection controller 113 at a time when a control data has to be transmitted while TP packets for the control data are kept in an output register included in the control data generator 105.

The null packet generator 106 generates, at a time when it is not necessary to multiplex the PES and control data, a TP packet as a code which is meaningless as a data but fills voids in the bit stream.

The TP header generator 109 generates a TP header which has to be multiplexed before the three PES streams 101 are read from the multiplex buffers $102_1$, $102_2$ and $102_3$ for multiplexing.

The channel selection controller 113 determines which code should be selected for one of the channels to the control data generator 105, multiplex buffers $102_1$, $102_2$ and $102_3$ and null packet generator 106, and sends a selection signal to a switch 114 to control the multiplex channels. When any one of the multiplex buffers $102_1$, $102_2$ and $102_3$ is selected, the switch 114 is controlled to read from the TP header generator 109 before reading from the multiplex buffers $102_1$, $102_2$ and $102_3$. For reading from the TP header generator 109, the switch 114 is provided with a one of parameters stated in the TP header and which varies depending upon a channel over which the reading is to be done and a timing at which the reading is to be done. The parameters thus delivered to the switch 114 include a packet ID (will be referred to as "PID" hereinunder), adaptation field control signal, etc. A code multiplexed by the switch 114 is delivered as a TP code to the PTS/DTS controller 116.

The PTS/DTS controller 116 swaps a PTS and DTS of a program being multiplexing between them when the PTS and DTS are not suitable for the PCR for the program, and sends it to an output controller 119 also included in the multiplexer. For example, when a PCR is generated from a value of a system time the multiplexer has, the input controller 103 acquires an elementary stream clock reference (will be referred to as "ESCR" hereinunder) along with PTS and DTS in the PES stream, clarifies the topological relation with the ESCR, and replaces it with the PTS and DTS having a correct topological relation with a PCR which is actually sent.

The output controller 119 reads and delivers a TS stream 120 at a time based on the system clock the multiplexer has.

As mentioned above, the virtual decoder buffer 130 simulates each of the buffers of T-STD specified for the MPEG2 system.

The TS stream 120 should be a bit stream with which all code buffers the decoders of the multiplexer have can operate without failure. Normally, the encoder to implement the coding as in the MPEG2 generates a bit stream with which all the buffers in a transport stream system target decoder (will be referred to as "T-STD" hereinunder) can work without failure.

In the receiver 4, the decoding is done inside the IRD 17 of which the configuration will be illustrated and described below with reference to FIG. 5.

The IF signal from the LNB 15 is supplied at an input terminal 82, tuned in a front-end circuit 83, demodulated by QPSK and delivered to a demultiplexer 84 where it is subjected to an error correction as necessary.

A demultiplexer 84 is provided to frame the demodulated signal into a code row of TP packets and judge whether each TP packet is a desired one or not. Next, if a desired code is a one having been encrypted, it is supplied to a descrambler 85 which will decrypt the code based on a descramble key supplied from an IC card 94. The output code from the descrambler 85 is stored once into a DRAM 86 via a demultiplexer 84.

There is also provided a video decoder 87 conforming to MPEG2. The video decoder 87 stores a code read from the DRAM 86 once into a DRAM 88 being an appropriate code buffer, decodes it as specified in MPEG2 at a good timing, further encodes it to an NTSC signal, and converts the NTSC signal to an analog brightness signal, color difference signal or a composite signal for delivery.

Also, there is provided an audio decoder 89 conforming to MPEG2. The audio decoder 89 stores a code read from the DRAM 86 once into a DRAM 90 being an appropriate code buffer, decodes it as specified in MPEG2 at a good timing, and converts it from digital to analog for delivery.

Further, a CPU 92 is provided to process a user command from a front panel 93 according to a program code embedded in a ROM 91, and control the front-end circuit 83, demultiplexer 84, and an IC card interface 95. Also, the CPU 92 controls the video decoder 87 and audio decoder 89 by means of the demultiplexer 84.

The demultiplexer 84 is provided to reproduce a clock having a same frequency as that of the receiving side using a synchronization control information superposed on a bit stream transmitted from the transmitting side, and controls the timing of start of decoding video and audio data codes or of displaying them. MPEG2 specifies that to reproduce a clock of a same frequency as that of the transmitting side, a PCR (program clock reference) data peculiar to a program should be coded into a TS stream being a multiplexed bit stream for superposition. Also, MPEG2 specifies that as an information for controlling the timing of start of decoding video and audio data or displaying them, a PTS (presentation time stamp) or DTS (decode time stamp) peculiar to the video and audio data should be coded for superposition.

At the transmitter 2, when the IRD 17 of the receiver 4 demultiplexes and demodulates the IF signal using the synchronization control information, the bit stream should be coded for superposition for the DRAM 86, DRAM 88 and DRAM 90 each being a code buffer to operate without failure.

Figure 6:
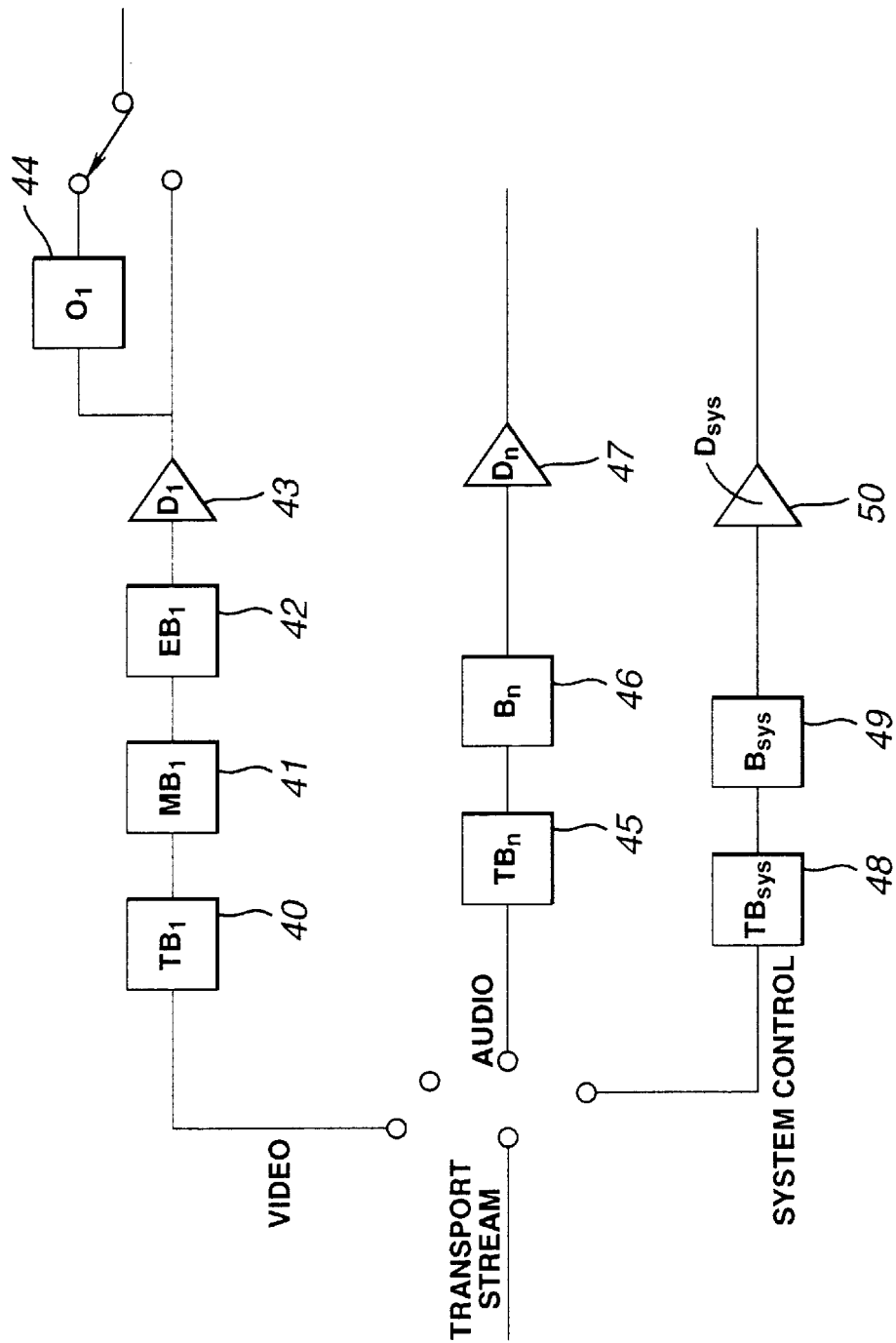
FIG. 6 shows the configuration of a transport stream system target decoder (T-STD) specified by MPEG2.

Normally, the above restrictions are applied within the encoders provided upstream of the multiplexer 11. The restrictions, specified in MPEG2, of the synchronization control of multiplexed bit stream will be described herebelow. FIG. 6 shows the T-STD specified in MPEG2. The transmitting side should transmit a coded data, synchronization control information and control data so that all the buffers of the T-STD can operate successfully.

In MPEG2, it is specified that a PCR superposed on a TS stream should state a predetermined time at which the last byte of the PCR will arrive at the input stage of the T-STD for a reason that by decoding the PCR, it can be known when all the bits of the TS stream arrive at the input stage of the T-STD.

To reproduce a certain program, it is assumed that input TS streams will be classified to different systems per video data, audio data and system control data. That is, the demultiplexer processes the TS streams in difference manners one from another per video data, audio data and system control data.

The system for video data comprises a transport buffer ($TB_1$) 40, multiplex buffer ($MB_1$) 41, elementary buffer ($EB_1$) 42, video decoder ($D_1$) 43 and a rearrangement buffer ($O_1$) 44. The system for audio data comprises a transport buffer ($TB_n$) 45, main buffer ($B_n$) 46 and a audio decoder ($D_n$) 47. The system for control data comprises a transport buffer ($TB_{sys}$) 48, main buffer ($B_{sys}$) 49 and a system decoder ($D_{sys}$) 50.

Each of the transport buffers provisionally store a bursting high-speed data stream just after being demultiplexed. The transport buffer has a size of 512 bytes, for example and can store more than two TS packets. When no data bytes exist in the transport buffer, no data byte transfer is effected. MPEG2 specifies that a bit stream should be configured for the transport buffer not to overflow.

In the T-STD, a multiplex buffer and elementary buffer are used as main buffer for video data. The multiplex buffer functions to buffer for a multiplex jitter of 4 ms for example and a PES overhead for a consistency of the rate of data transfer to an elementary buffer at a next stage.

An example in which the buffers of the T-STD shown in FIG. 6 fail will be described below. Since the TS bit rate is high, when the rate of input to TB is over the lead rate, the $TB_1$ 46, $TB_n$ 45 and $TB_{sys}$ 48 are likely to overflow if many packets are successively supplied to a same TB.

Figure 7:
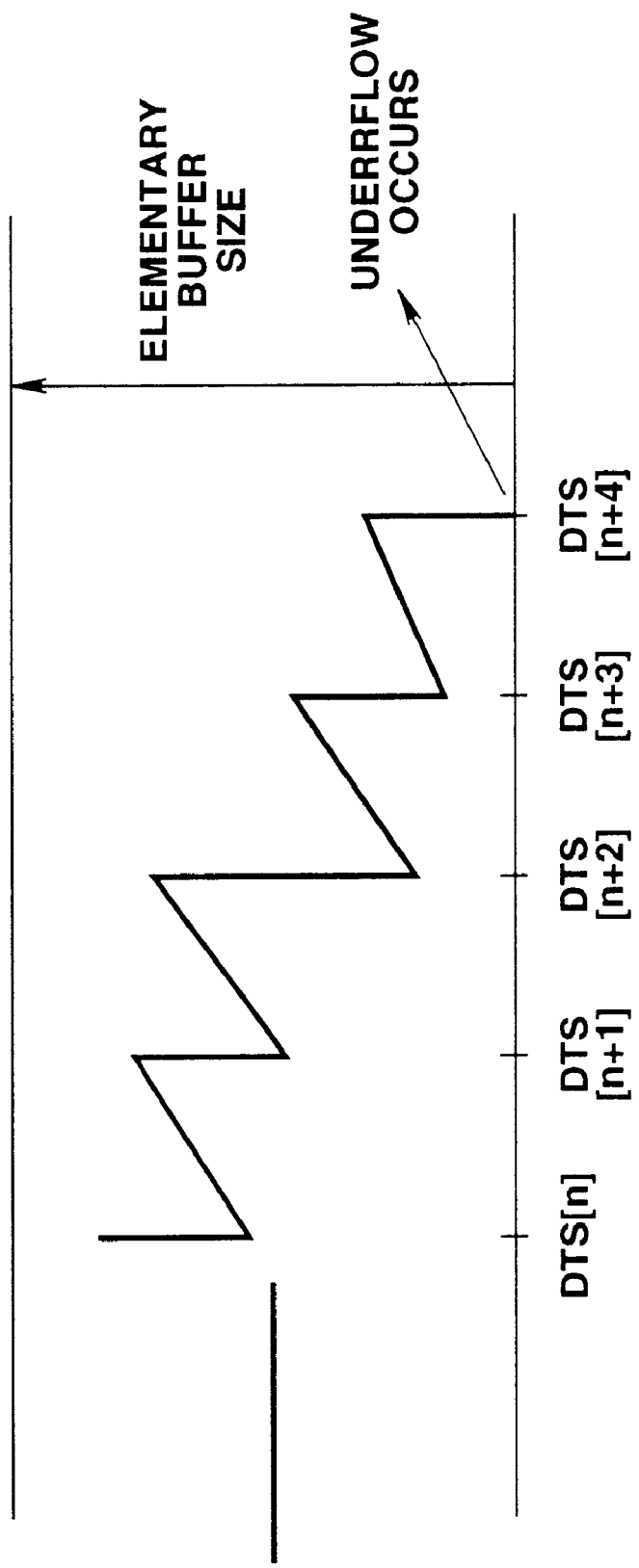
FIG. 7 explains how an underflow is caused by a video elementary buffer used in the T-STD.

When a video PES stream, for example, supplied to the conventional multiplexer without conformity with the restrictions to VBV and at an excessively earlier timing than the PTS and DTS is multiplexed with a small delay of the multiplex buffers, the $MB_1$ 41 and $EB_1$ 42 in the video system and the $B_n$ 46 in the audio system will fail. Also, if the multiplex buffers 102 delay too much while the timing of input to the conventional multiplexer is appropriate, $EB_1$ 42 and $B_n$ 46 will underflow. FIG. 7 shows how the $EB_1$ 42 in the video system underflows. At the $EB_1$ 42 of the D-STD, DTS superposed on the bit stream used to start decoding, that is, a data for 1 AU is instantaneously extracted from the $EB_1$ 42. If an excessive delay takes place at the multiplex buffers, an underflow will occur and no normal decoding be possible because all AU codes for DTS[n+4] have not arrived at the $EB_1$ 42.

Thus, to prevent the buffers of T-STD from failing, the input PES stream carries an appropriate synchronization control information. The PES stream supplied to the conventional multiplexer at a good timing is multiplexed for the multiplex buffers 102 not to delay excessively when the channel selection controller 113 controls the switch 114 for channel selection. Further, a rule that multiplexing should not be done continuously over a certain channel (multiple channel selection algorithm) is applied to control the multiplex channel selection. Moreover, the PTS and DTS values are controlled by the PTS/DTS controller 116 so that the synchronization control information carried by the input PES stream is correctly conveyed. With these arrangements, it is made difficult for the buffers of the T-STD to fail.

Figure 5:
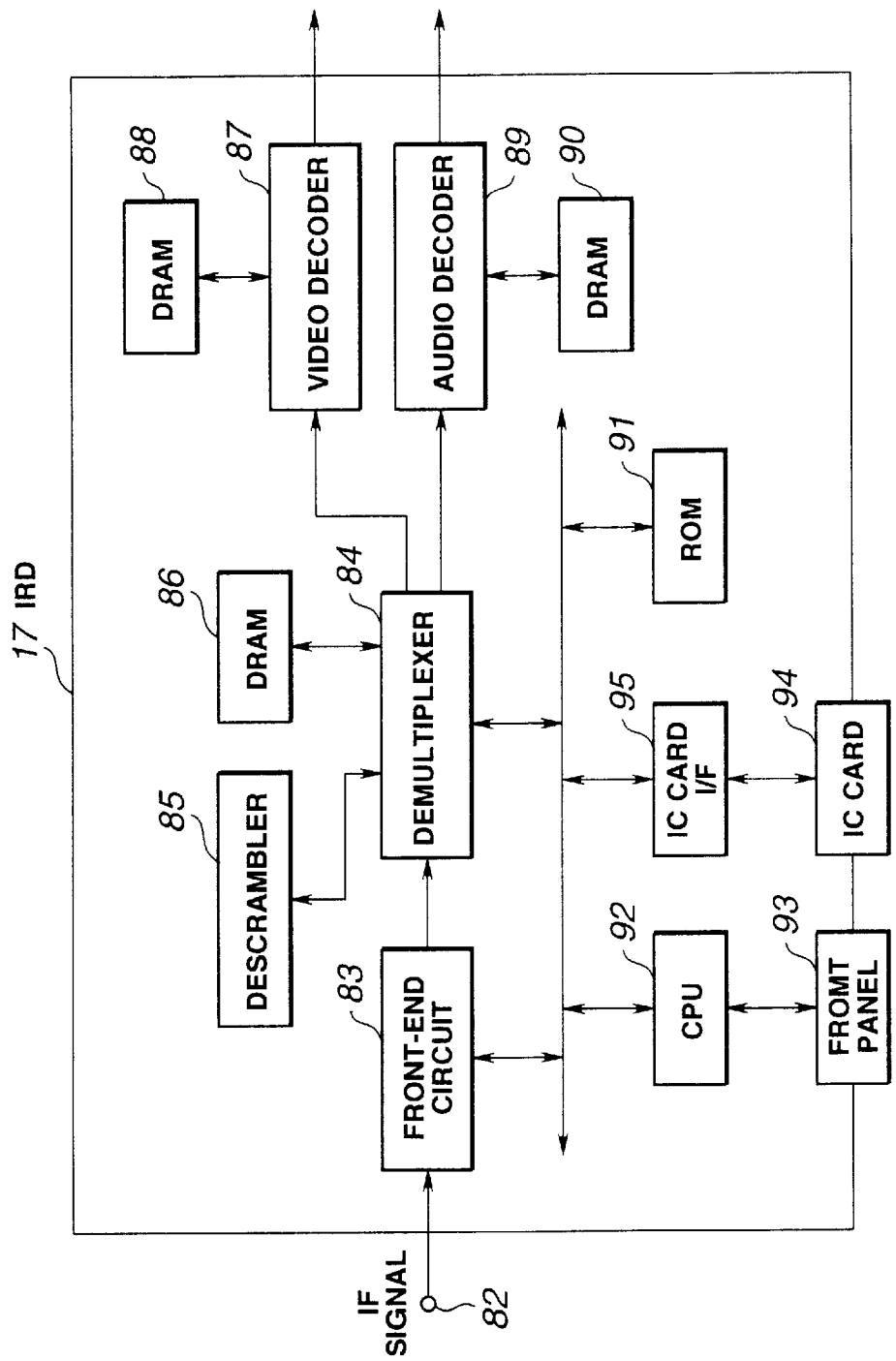
FIG. 5 is a block diagram of an integrated receiver decoder as an essential component of the digital satellite broadcasting system.

If the encoder provides an appropriate beat stream for the synchronization control at the reproducing side, the multiplexer adapted as in the above can multiplex a plurality of programs of coded video and audio data, and the IRD as shown in FIG. 5 can be used to normally reproduce video and audio data from an output bit stream from the multiplexer in many cases.

However, the conventional multiplexer cannot fully assure the normal operation of each of the T-STD buffers. If the multiplex buffer 102 on any certain channel, for example, shows a more delay for any reason, a situation will exist in which the virtual buffers of the T-STD are likely to fail.

If an appropriate code topology an input stream inherently has for the synchronization control is broken due to any bit manipulation done to the input stream such as removal of invalid code from the input stream, even the conventional multiplexer adapted as in the above will not be able to assure the normal operation of the virtual buffers of the T-STD.

When a certain IRD is used to simulate each buffer of the T-STD for actual operation of the buffer at the transmitting side, it is difficult to have the buffer operate as specified for a memory configuration, inter-memory transfer rate and inter-memory transfer delay.

To avoid the above, the first embodiment of the multiplexer 11 shown in FIG. 4 incorporates a virtual decoder buffer 130 to simulate each buffer of the T-STD as specified for the MPEG2 system.

Figure 8:
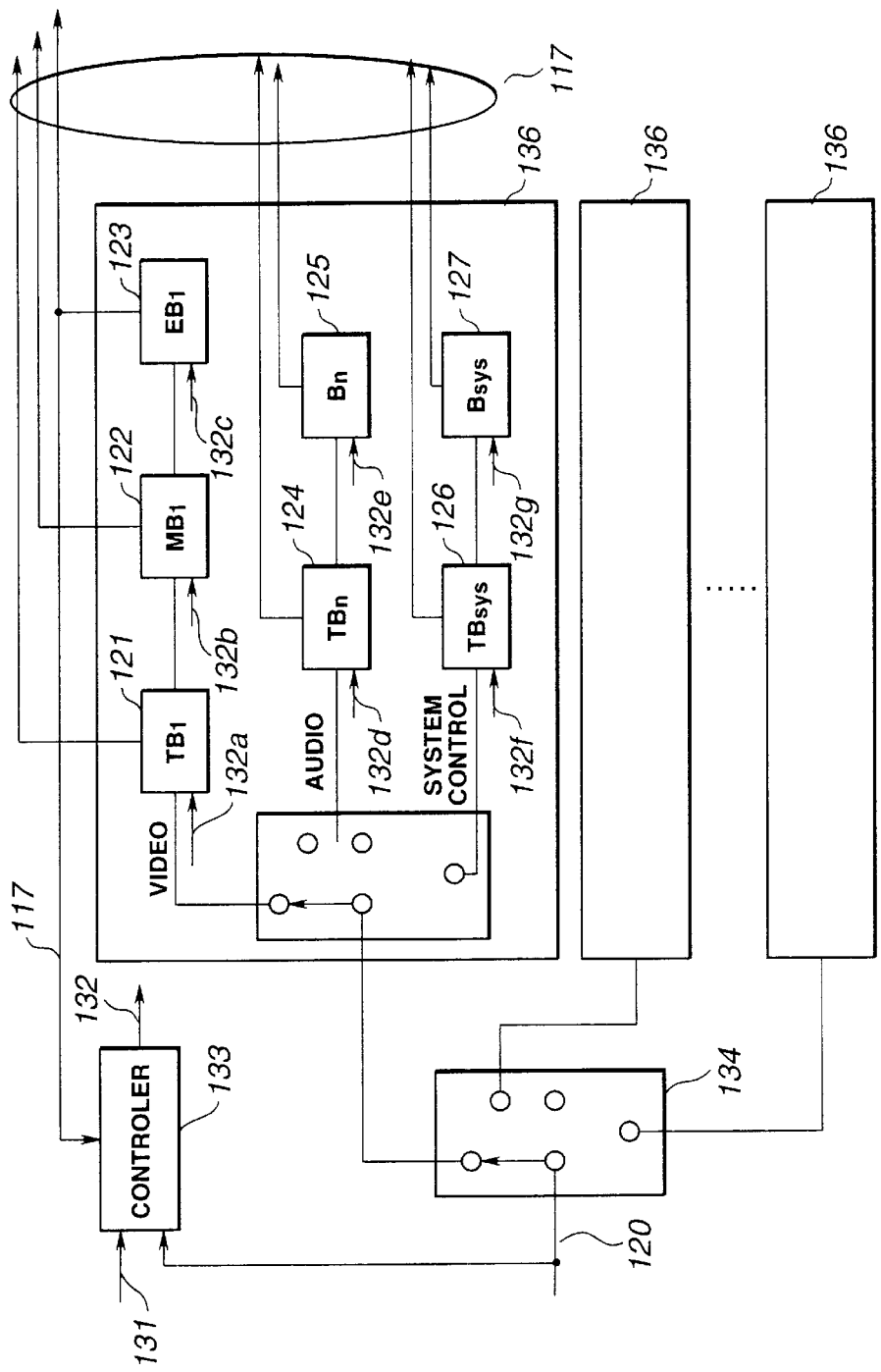
FIG. 8 is a block diagram of a virtual decoder buffer as an essential component of the first embodiment of the multiplexer in FIG. 4.

FIG. 8 shows an example of the configuration of the virtual decoder buffer 130. The virtual decoder buffer 130 comprises a controller 133 to control a virtual decoder 136 for each program and input and output to and from each buffer in the virtual decoders 136, and a selector 134 to allocate multiplexed streams 120 to the virtual decoders 136 for various programs, respectively. The virtual decoder for each program comprises, like the T-STD buffers specified in MPEG2, $TB_1$ 121, $MB_1$ 122 and $EB_1$ 123 for video data, $TB_n$ 124 and $B_n$ 125 for audio data, and $TB_{sys}$ 126 and $B_{sys}$ 127 for system control. These buffers are each of an FIFO type. The buffers are connected to each other as shown in FIG. 8. It should be noted that the buffers $EB_1$, $B_n$ and $B_{sys}$ are open at outputs thereof.

The virtual decoder buffer 130 thus configured functions as will be described below:

The controller 133 allocates the multiplexed codes 120 supplied from the output controller 119 to the virtual decoders 136 for various programs by controlling selectors 134 and 135 with a PID information supplied from the channel selection controller 113. More particularly, the multiplexed codes 120 are allocated to $TB_1$ 121 for video data, $TB_n$ for 124 for audio data or $TB_{sys}$ 126 for control data, corresponding to various programs, respectively. In this case, since the PID information is already known when the controller 133 supplies one packet of multiplexed code, if PCR represents a program clock reference of the multiplexer, little delay takes place at the selectors 134 and 135, namely, data can be supplied to the TB with little delay.

All the buffers in the virtual decoder 136 for each program operate as specified in MPEG2 taking a system time set in the multiplexer as the time base. Therefore, the controller 133 is supplied with a TP header length, PES header length and PES stream ID in addition to the PID over a data line 131 from the channel selection controller 113. The controller 133 is also supplied with a multiplexed code 120 and detects a start code for AU and PES. The controller 133 judges, based on these information, which data part of the multiplexed code 120 is to be supplied to each buffer in the virtual decoder buffer, and controls input and output to and from each buffer over control lines 132a, 132b, 132c, 132d, 132e, 132f and 132g.

The video code system functions as will be described below:

All TP codes of video data allocated to the virtual decoders matching a certain PID are supplied to $TB_1$ 121 at same rate as the multiplexed code 120. The output from $TB_1$ 121 is wholly read for delivery at a rate specified with a level and profile specified in MPEG2. The $MB_1$ 122 is connected to $TB_1$ 121, but the output from the $TB_1$ 121 will not always be wholly written into the $MB_1$ 122. The TP header part will not be written, but the controller 133 controls the write enable signal to write only a TP payload, namely, a code part corresponding to PES into the $MB_1$ 122.

As an output from $MB_1$ 122, the input data is wholly read from the buffer. In this case, however, the reading timing differs from one mode to another of transfer from MB to EB as specified for the MPEG 2 system. Here the operation for transfer by the leak method will be described. If the data occupancy in the $EB_1$ 123 is full, namely, if it is same as the buffer size, no reading is done from the buffer $MB_1$ 122. Otherwise, reading will be done at a rate specified with a level and profile in MPEG2. To this end, the data occupancy in the $EB_1$ 123 is conveyed to the controller 133 as well. The $EB_1$ 123 is connected to the $MB_1$ 122, but the code from the $MB_1$ 122 is not only wholly written into the $EB_1$ 123 but also the controller 134 controls the write enable signal to remove the header part of PES as well as to write only the ES code part of a video data also in the payload part of PES stream.

According the rule, all the AU codes corresponding to a DTS should be extracted from the output from $EB_1$ 123 instantaneously at a time represented by the DTS. However, the codes are not instantaneously delivered from the $EB_1$ 123, but since the $EB_1$ 123 is of an FIFO type, a reading address in the buffer is moved at that time for the quantity of codes to be extracted. The DTS data is managed by the controller 133. When it is judged that all the AU codes corresponding to the DTS have not arrived at the $EB_1$ 123, it can be considered that the EB underflows.

For the aforementioned operations, each time TP is delivered as a multiplexed code 120, the controller 133 stores positional information of each TP packet including start and end points of a code to be supplied to the $MB_1$ 122 and $EB_1$ 123 and AU start code based on start codes of detected AU and PES, TP header length and PES header length and PES stream ID information from the channel selection controller 113. In addition, to actually supply $TB_1$ 121 and $MB_1$ 122 with codes, it is stored where the memory has addresses for codes of the start and end points, thereby generating a write enable timing signal for selection of codes for supply to the $MB_1$ 122 and $EB_1$ 123. Also, when a reading pointer for $EB_1$ 123 is moved, it is stored where the memory has an address for AU start code, whereby simulating a timing of data removal from EB.

Thus, each buffer in the virtual decoder 136 for each program is actually operated to deliver a data occupancy data 117 of each buffer to the channel selection controller 113. In this case, any filter to select codes for supply to each buffer has not to be provided upstream of the $MB_1$ 122, $EB_1$ 123, $B_n$ 125 and $B_{sys}$ 127. Therefore, a delay caused by passing through such a filter will not take place and the operation of the T-STD specified in MPEG2 can be implemented. Although the selector 134 is used to allocate data to the decoder buffer for each program as having been described in the foregoing, the selector 134 and selector in the virtual decoder 136 for each program may not be provided separately. These selectors may be integrated into one selector.

Here it is assumed that based on a multiplex channel selection algorithm, the channel selection controller 113 preferentially selects a control data first and selects a channel for a buffer of the largest data occupancy as a multiplex channel when it is not necessary to select such a control data. However, even if such an algorithm is used to select a multiplex channel, it cannot be assured that the T-STD buffers can operate perfectly without failure. To attain a perfectly successful operation of the T-STD buffers, the virtual decoder buffer 130 is monitored preferentially over such a multiplex channel selection algorithm, and when a possible failure of the T-STD buffers is detected, the following operation is done:

If it is detected when TB or $TB_{sys}$ for a program is near the overflow level, for example, multiplexing of video and audio codes or control data for the program is inhibited until the data occupancy level becomes sufficiently lower. If the EB for a program is full of video codes, from which it is detected that an MB connected to the EB is near the overflow level, no multiplexing is done until the level is lowered somehow. On the contrary, if it is detected that the EB for a program is likely to underflow, a stream for the program is preferentially multiplexed. This is also true for the $B_n$ and $B_{sys}$ for audio and control codes. When a likelihood of overflow or underflow with a program is detected, multiplexing is forcibly inhibited or preferential multiplexing is done.

Thus it is possible to prevent a failure of the T-STD buffers due to a multiplexing.

Since the first embodiment of the multiplexer 11 shown in FIG. 4 incorporates the virtual decoder buffer 130 and memory buffers in practice, the hardware scale is unignorably large as the case may be. To reduce the hardware costs, a decoder buffer simulator to simulate the data occupancy change of each buffer for each program may be used in place of the above-mentioned virtual decoder buffers. A variant of the first embodiment of the multiplexer 11 will be described herebelow with reference to FIGS. 9 and 10.

Figure 9:
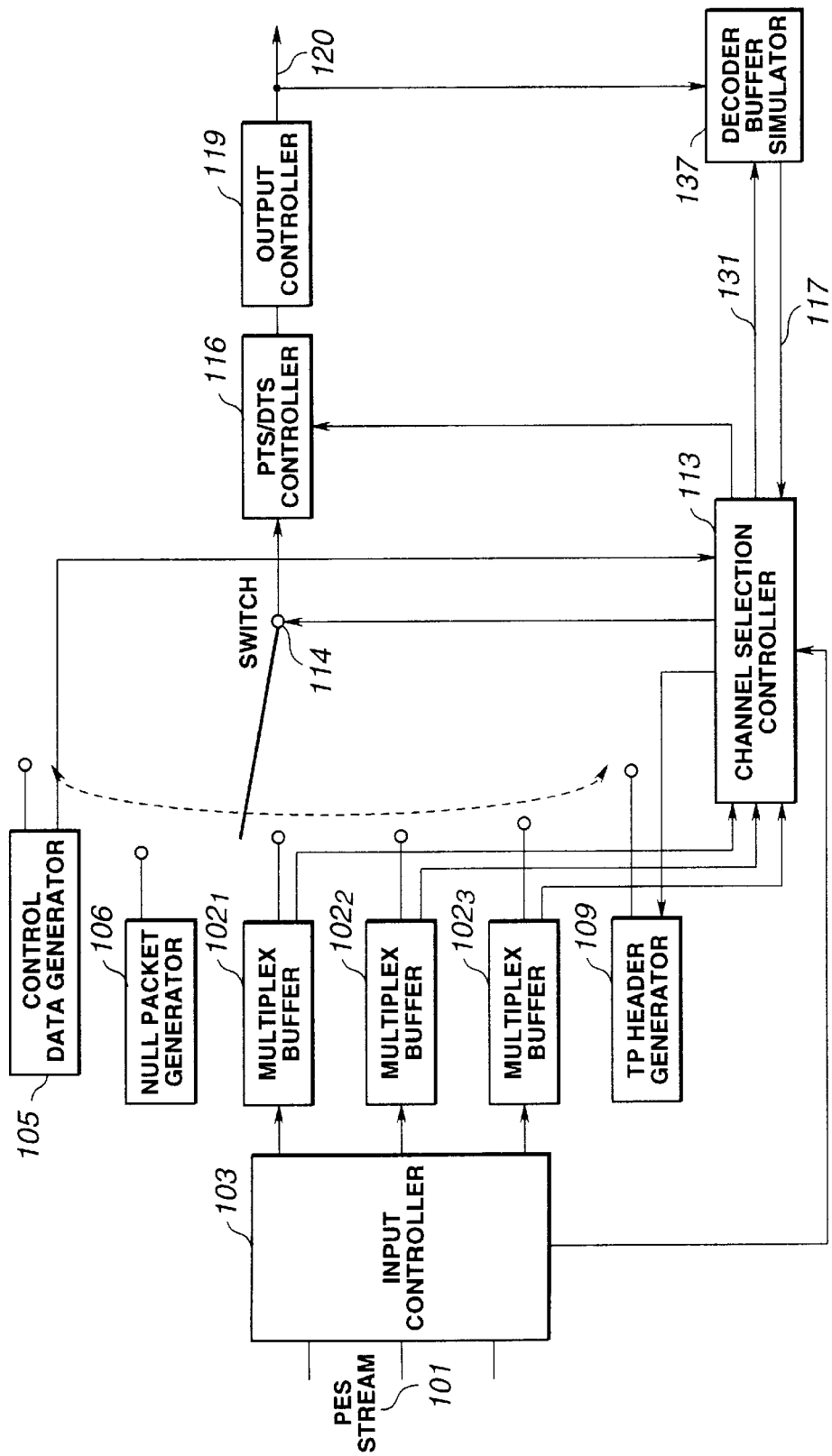
FIG. 9 is a block diagram of a variant of the first embodiment of the multiplexer of the present invention.

FIG. 9 shows the configuration of the variant of the multiplexer comprising such a decoder buffer simulator. As shown, a decoder buffer simulator 137 is provided, in place of the virtual decoder buffer in FIG. 4, to simulate the data occupancy in the code buffer used to demultiplex and decode data for each program. In this variant, the multiplex code (TS) 120 may not always be supplied to the decoder buffer simulator 137. The rest of the multiplexer is similar to the multiplexer shown in FIG. 4.

Figure 10:
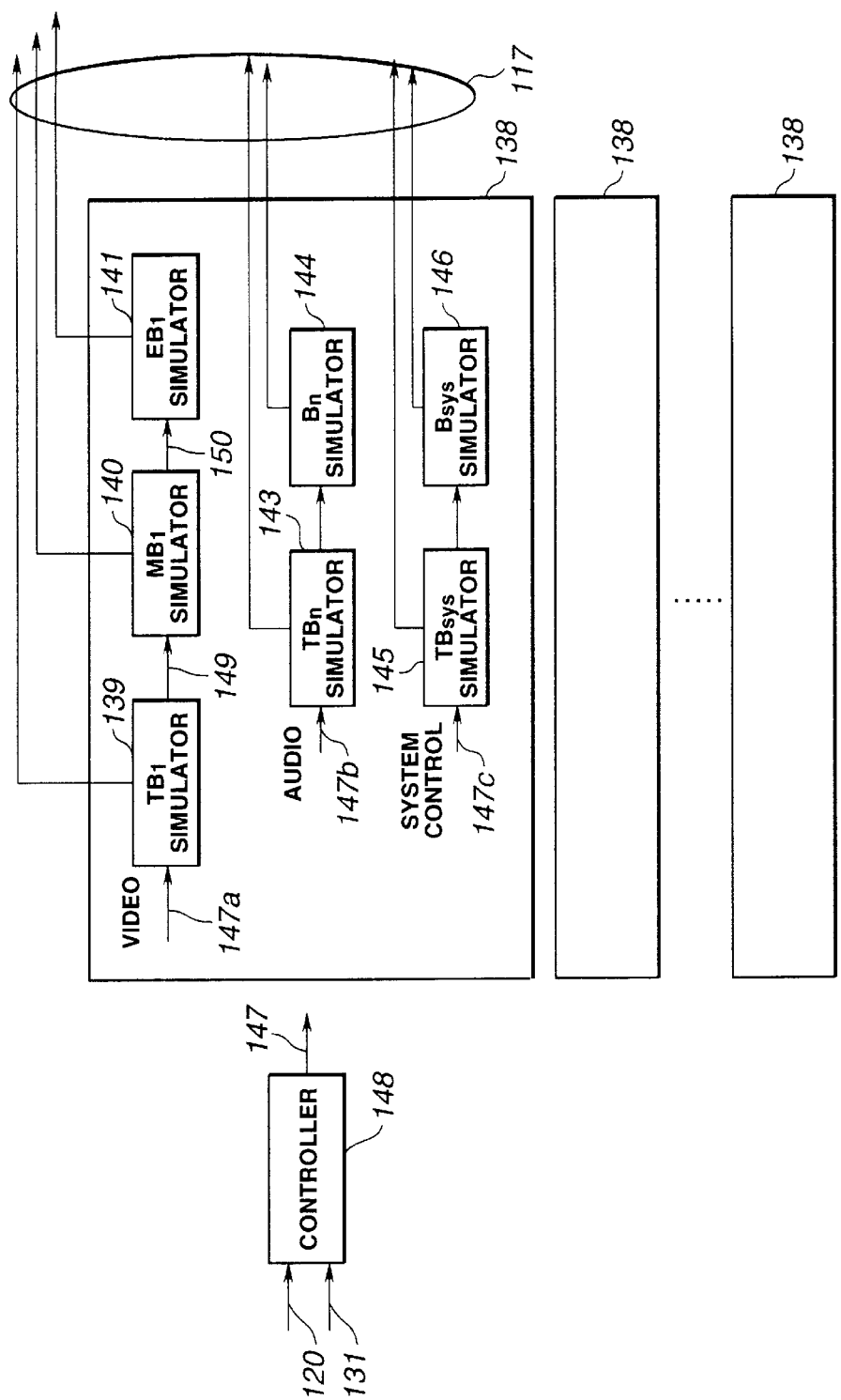
FIG. 10 is a detailed block diagram of a decoder buffer simulator as an essential component of the variant in FIG. 9.

FIG. 10 shows the configuration of the decoder buffer simulator 137. The decoder buffer simulator 137 comprises a buffer simulator 138 for each program, and a controller 148 to supply an input parameter for each simulator in the buffer simulator 138.

The buffer simulator 138 for each program simulates the data occupancy in the code buffer for three systems including a video system, audio system and system control system. The video system comprises TB$_1$ simulator 139, MB$_1$ simulator 140, and EB$_1$ simulator 141. The audio system comprises TB$_n$ simulator 143 and B$_n$ simulator 144. The system control system comprises TB$_{sys}$ simulator 145 and B$_{sys}$ simulator 146.

The decoder buffer simulator 137 constructed as in the above functions as will be described below:

The controller 148 is supplied with a PID information supplied from the channel selection controller 113 in FIG. 9, TP header length and PES header length of a multiplexed code, and ID information of PES stream. The controller 148 is supplied with a multiplexed code 120 and detects AU and PES start codes. Then, at a period for multiplexing one TP packet, it supplies a TB simulator provided at the first stage inside the buffer simulator 138 for each program and corresponding to PID in the multiplexed code with a data start information of the multiplexed code from which a range of input to each buffer can be known.

Based on the data start information and a time interval of multiplexing TP, derived from a system time the multiplexer has, each buffer simulator updates, by calculation, the quantities of input and output to and from each buffer, defined by the T-STD, at the period for multiplexing one packet to update the data occupancy in the buffer.

The audio system of the multiplexer functions as will be described in detail herebelow:

The TB$_1$ simulator 139 is supplied, from the controller 148, with an input code length data and TP overhead code length data matching a certain PID of a video code. The TB$_1$ simulator 139 takes the TP packet size as the code length of an input to TB at a period for multiplexing one TP packet. Also, taking in consideration the speed of removing a code designated with a level and profile as specified min MPEG2, the TB$_1$ simulator 139 calculates a code output length at a period for multiplexing one TP packet. Then the TB$_1$ simulator 139 calculates a current data occupancy in TB by adding a data occupancy at a time one period for multiplexing one TP packet before and the input code length, and subtracting the output code length. The controller 148 transmits to the TB$_1$ simulator 139 a TP payload start position data indicating at which byte counted from the top of the TP packet the TP payload is to start. The TB$_1$ simulator 139 transmits, based on the above data, to the MB$_1$ simulator 140 a TP payload code length data among the codes delivered at a time when one TP is multiplexed. When a PES payload top and AU start code are included in the TP payload, their respective position data are transmitted from the controller 148 to the TB$_1$ simulator 139 where the data are used by the MB$_1$ simulator 140 and EB$_1$ simulator 141 for calculation. When the above start position is included in the output code, the TB$_1$ simulator 139 transmits the position data to the MB$_1$ simulator 140. Thus, the results of calculation of the data occupancy in buffer, TP payload code length and PES payload start position data in the output code, and AU start position data are updated at a period for multiplexing one TP packet.

The MB$_1$ simulator 140 is supplied from the TB$_1$ simulator 139 with a TP payload code length as a code length of input to MB. The code output length will be described concerning the leak method although the output timing varies depending upon the mode of transfer from MB to EB specified in MPEG2. If the data occupancy simulated by the EB$_1$ simulator 141 is full, namely, as large as the buffer size, the output length is taken as zero. Otherwise, taking in consideration a removing rate specified with a level and profile in MPEG2, the code output length at the period for multiplexing one TP packer is calculated. Further, a data occupancy at a time a period for multiplexing one TP packet before and the code input length are added together, and the code output length is subtracted from the result of addition, thereby calculating a current data occupancy in MB. The PES payload start position data supplied from the TB$_1$ simulator 139 is used to calculate a PES payload length data among the codes delivered at a time of multiplexing one TP packet, and the PES payload length data thus calculated is transmitted to the EB$_1$ simulator 141. When AU start position is included in the output code since an AU start position data supplied from the TB$_1$ simulator 139 is used, the position information is conveyed to the EB$_1$ simulator 141.

The EB$_1$ simulator 141 is supplied from the MB$_1$ simulator 140 with a PES payload code length as a code length of input to EB. The EB$_1$ simulator 141 is supplied with a DTS code length as code output length from the controller 148. When it is judged that a time represented by the DTS has passed, the AU code length corresponding to the DTS is calculated as an output code length. Break of each AU is recognized using an AU start position data from the MB$_1$ simulator 140 and the code length of each AU is determined by calculation.

Thus, at a period for multiplexing one TP packet in the multiplexer, the data occupancy of each of TB$_1$ MB$_1$ EB$_1$ B$_n$, TB$_{sys}$ and B$_{sys}$ is updated by each of the decoder simulators 138 and the buffer data occupancy 117 can be supplied to the channel selection controller 113.

Next, the second embodiment of the multiplexer 11 according to the present invention will be described hereinunder. The second embodiment provides a multiplexing after removing invalid portion of a PES stream of video and audio data supplied to the multiplexer and processing the bit stream.

Figure 11:
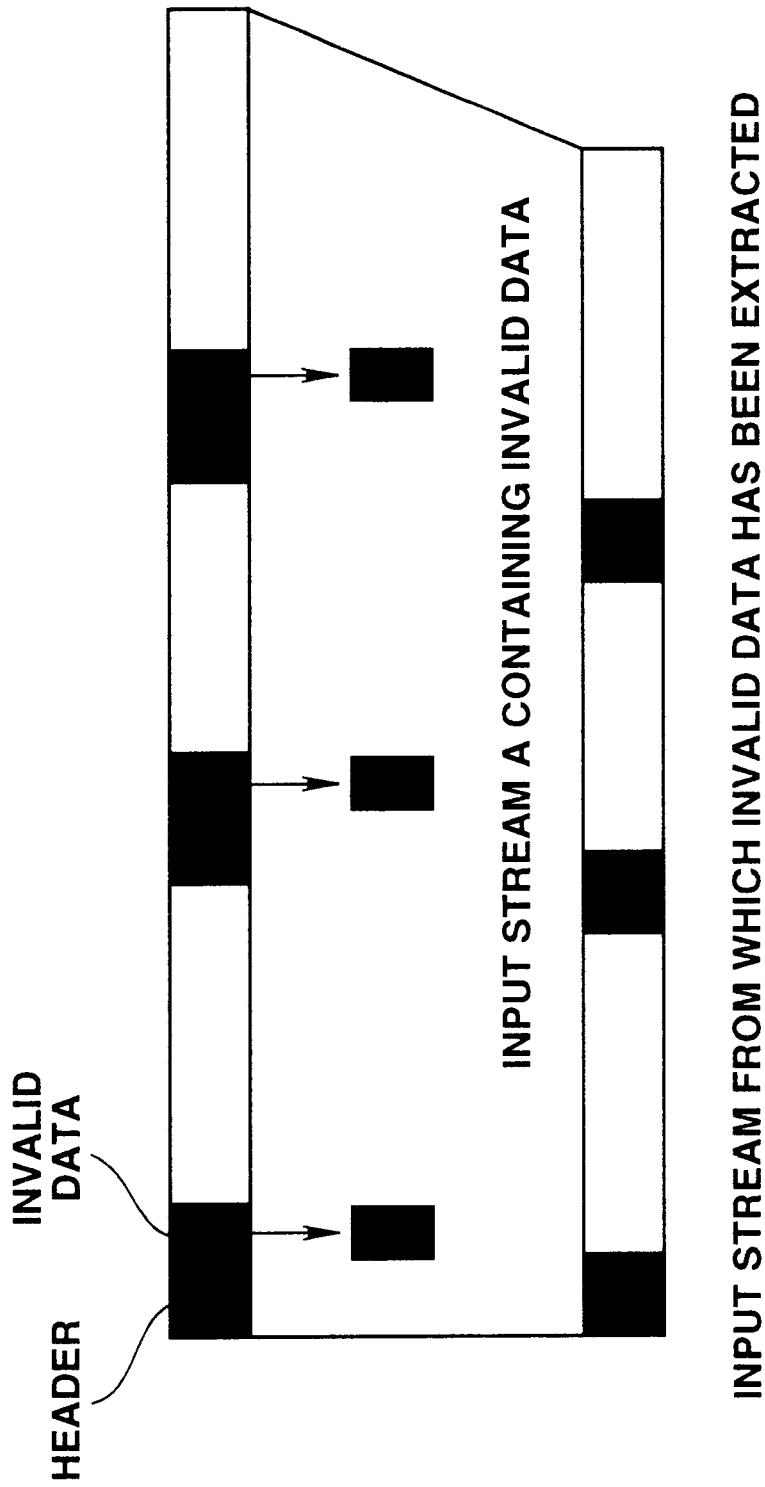
FIG. 11 explains how invalid data are extracted in a second embodiment of the multiplexer according to the present invention.

In FIG. 11, the upper bit stream is an input bit stream A including an invalid data which is meaningless in data reproduction at the receiving side. The lower bit stream is a one obtained by removing invalid data from the bit stream A to reduce the original data length. By removing invalid data from data over each channel, another bit stream can be transmitted when an ample band is available for transmission of the bit stream. This example is disclosed in the Applicant's Japanese Published Unexamined Patent Application No.9-340414. However, removal of invalid data will cause a deviation between a topology of bit train and original topology of input stream, so that the synchronous topology the input stream maintains will be inappropriate. The second embodiment provides a multiplexing method capable of appropriately maintaining the synchronous topology of bit train even when invalid data is removed.

Figure 12:
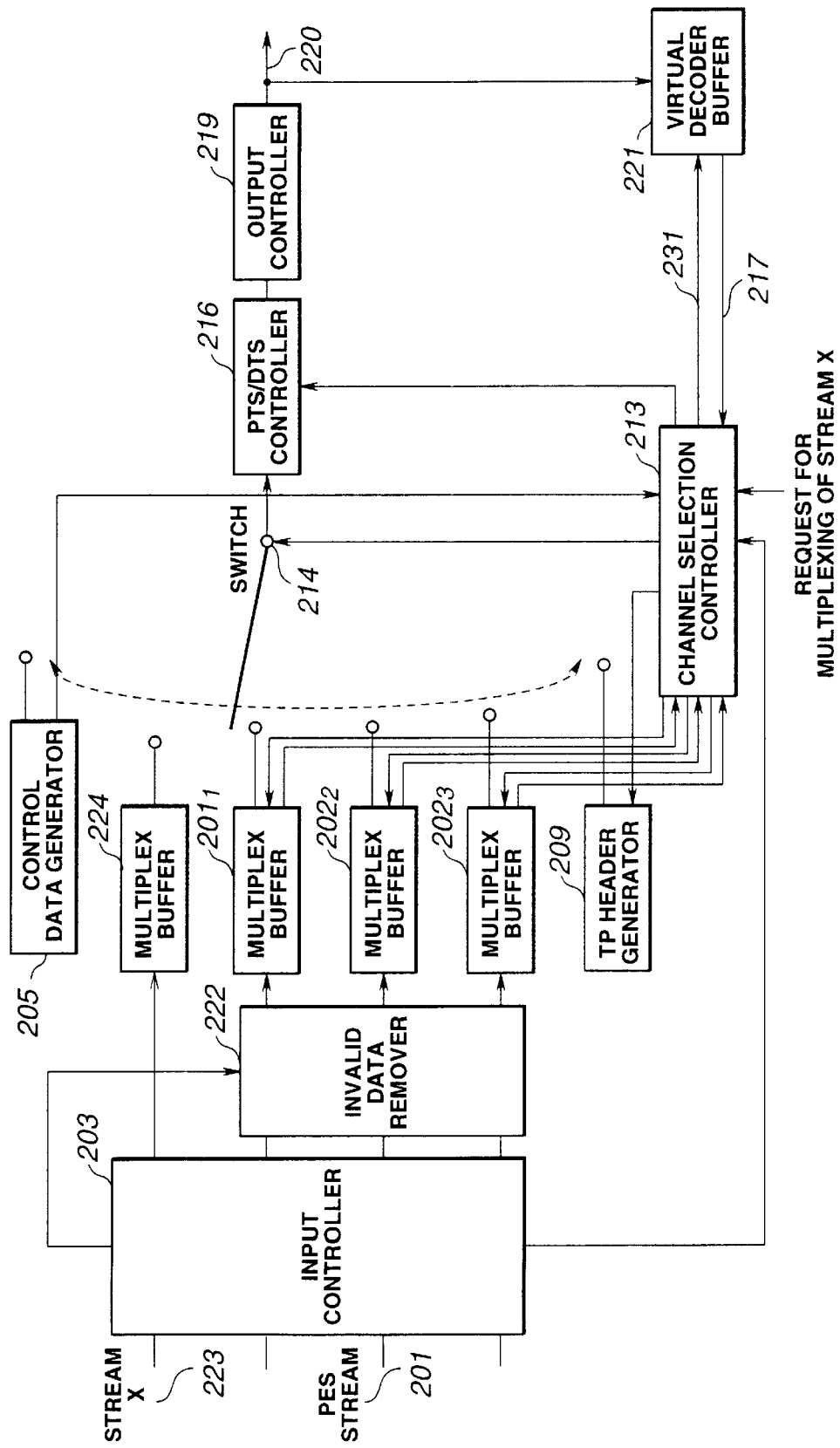
FIG. 12 is a block diagram of the second embodiment of the multiplexer in FIG. 11.

FIG. 12 shows the configuration of the second embodiment. Differences from the first embodiment will mainly be described.

As shown in FIG. 12, a PES stream 201 is supplied to an input controller 203 having an invalid data remover 222. Receiving the PES stream at the invalid data remover 222, the input controller 203 analyzes the head of the PES stream 201 to acquire an synchronization control information of the input stream and extract an invalid data if any when its length is known. MPEG2 specifies a special stream called "padding stream" as a PES stream. The padding stream is a PES stream which is wholly invalid. When such a stream is supplied to the input controller 203, a header analyzer inside the input controller 203 acquires an information called "stream ID" from the PES header information to judge whether the input stream is a padding stream, thereby knowing whether an invalid data exists. When it is judged that an invalid data exists in the input stream, the input controller 203 controls the invalid data remover 222 not to deliver such an invalid data part to multiplex buffers 202. The input controller 203 also supplies a channel selection controller 213 with a length data of the invalid data.

A stream X223 shown in FIG. 12 is transmitted at some free rate resulted in the transmission band from the removal of invalid data in the multiplexer. It is supplied to multiplex buffers 224 via the input controller 203.

The channel selection controller 213 selects as a multiplex channel any of channels for control data or for multiplex buffers 202 according to a predetermined multiplex channel selection algorithm. However, if a request for multiplexing the stream X is supplied from outside, the channel selection controller 213 selects multiple data from the stream X and controls a switch 214 when it is not necessary to multiplex the control data or data in the multiplex buffers 202 because of the removal of invalid data by the invalid data remover 222.

When the PES stream 201 has the invalid data removed as mentioned above is multiplexed based on the conventional multiplex channel selection algorithm, the correct topology the bit stream inherently has will be broken, resulting in a likelihood of T-STD buffer failure. For example, when the multiplex channel selection algorithm used is such that a channel for a buffer of which the data occupancy is largest is selected, since an invalid data is removed from the PES stream on a channel, the increase of data occupancy is delayed and thus multiplexing is delayed in comparison with a PES stream from which such an invalid data has not been removed. Thus, EB of the T-STD will possibly underflow. The multiplexer has a virtual decoder buffer 221. The T-STD buffers are simulated and the data occupancy of the buffers is monitored by the channel selection controller 213, so that when a possible underflow is detected on a channel, multiple data over the channel can be preferentially selected to prevent the T-STD buffers from failing.

Next, the third embodiment of the multiplexer 11 will be described. Also in this third embodiment, the content of an input bit stream is manipulated as in the second embodiment. Different from the second embodiment, the third embodiment further manipulates bits of payload part of an input data.

Figure 13:
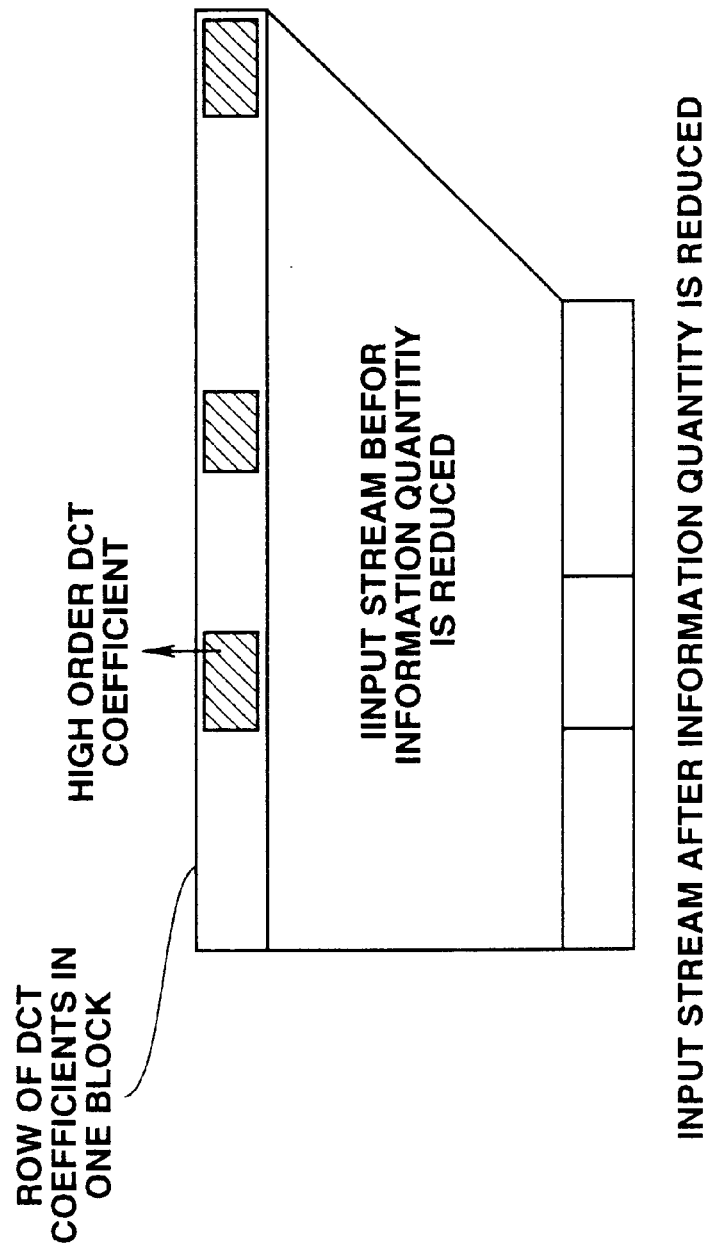
FIG. 13 explains how information quantity is reduced in a third embodiment of the multiplexer according to the present invention.

In FIG. 13, the stream shown at the upper portion is a part of ES in an input PES stream of a video data. It consists of DCT coefficients row in a data train compressed as in MPEG2. The DCT coefficients row in one DCT block forms a bit train in an order from low-order to high-order coefficients at the time of delivery. In such a data part, the high-order coefficient portion is cut to shorten the original data length. This is shown at the lower portion of FIG. 13. When it is necessary to deliver TS at a bit rate lower than the total bit rate of the PES stream on each input channel, high-order ones of the DCT coefficients are removed from data on each channel to lower the bit rate before the PES stream is multiplexed. Such an example is disclosed in the Applicant's Japanese Published Unexamined Patent Application No.9-292989. However, removal of a part of the payload data causes the topology of a bit train to deviate from the original topology of an input stream with a result that the synchronization topology the input stream holds becomes inappropriate. The third embodiment provides a multiplexing method adapted to keep the synchronization topology also when a payload data is partially removed.

Figure 14:
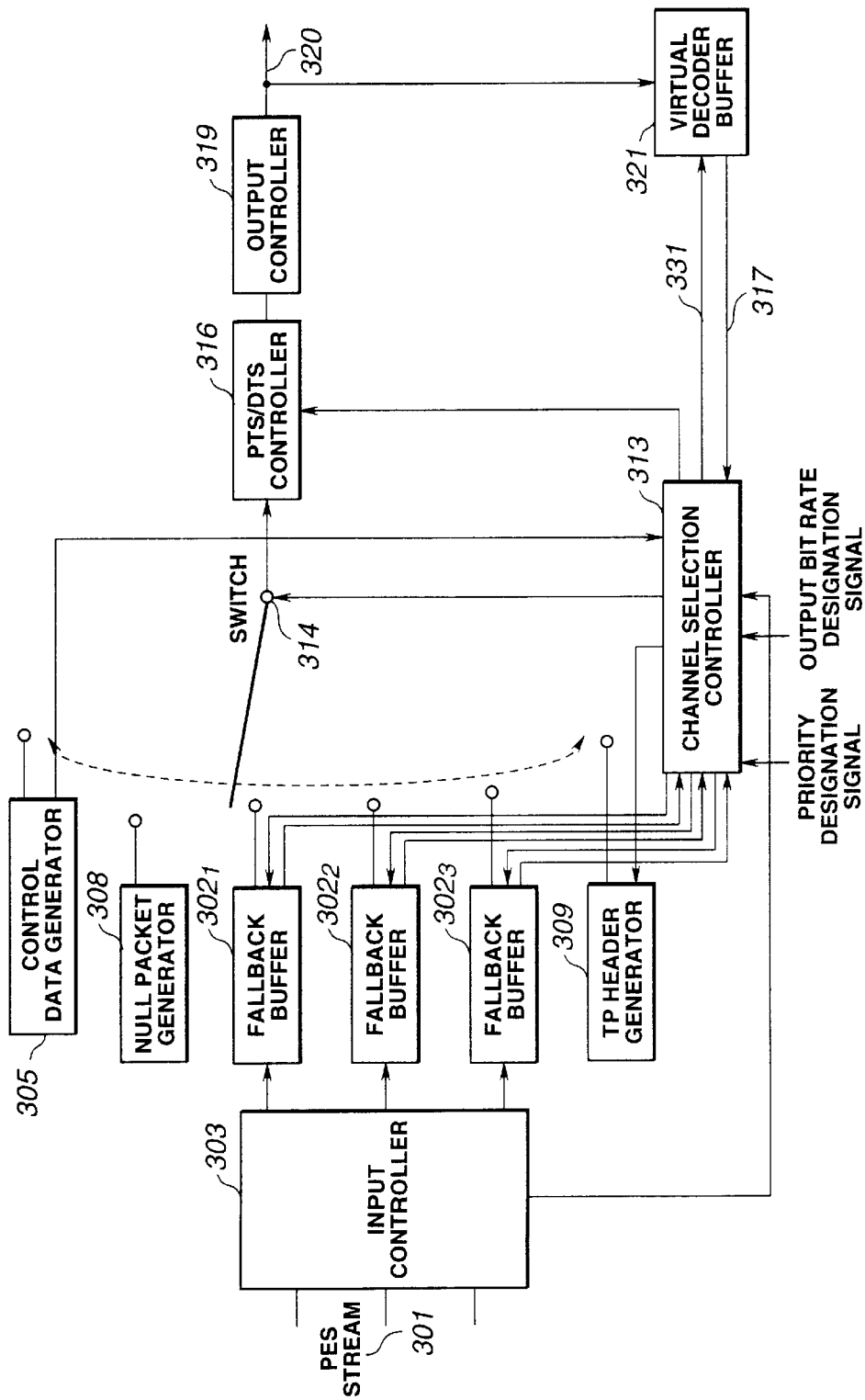
FIG. 14 is a block diagram of the third embodiment of the multiplexer in FIG. 13.

The configuration of the third embodiment of the multiplexer is shown in FIG. 14. Differences of the third embodiment from the first embodiment will mainly be described below.

The third embodiment comprises fallback buffers 302 in which a payload data in a video PES stream is partially cut as necessary. In one fallback buffer, high-order coefficient parts in the DCT coefficients row in the payload data in the input PES stream are deleted in some patterns or stepwise, or not deleted in some cases. The cut data trains are stored into a corresponding fallback buffer. One is selected from the plurality of fallback buffers to deliver a data train implementing a data reduction most approximate to an information quantity reduction level data supplied from a channel selection controller 313, and the data occupancy data of the fallback buffer is supplied to the channel selection controller 313.

When the channel selection controller 313 is supplied with an output bit rate designation signal, if the bit rate is slower the reference bit rate, an extent of information quantity reduction is determined for each channel according to an external preferential-information signal indicative of the importance of reproduction quality of each channel, and an information quantity reduction control signal indicative of the extent is supplied to the fallback buffers 302. The data occupancy of the fallback buffers is monitored to implement a data reduction from each fallback buffer that conforms to the information quantity reduction control signal. The multiplex channel selection algorithm used for PES stream is such that a channel to a fallback buffer whose data occupancy is largest, for example, is selected based on the data occupancy of the fallback buffer selected for each channel as in the above.

Figure 15:
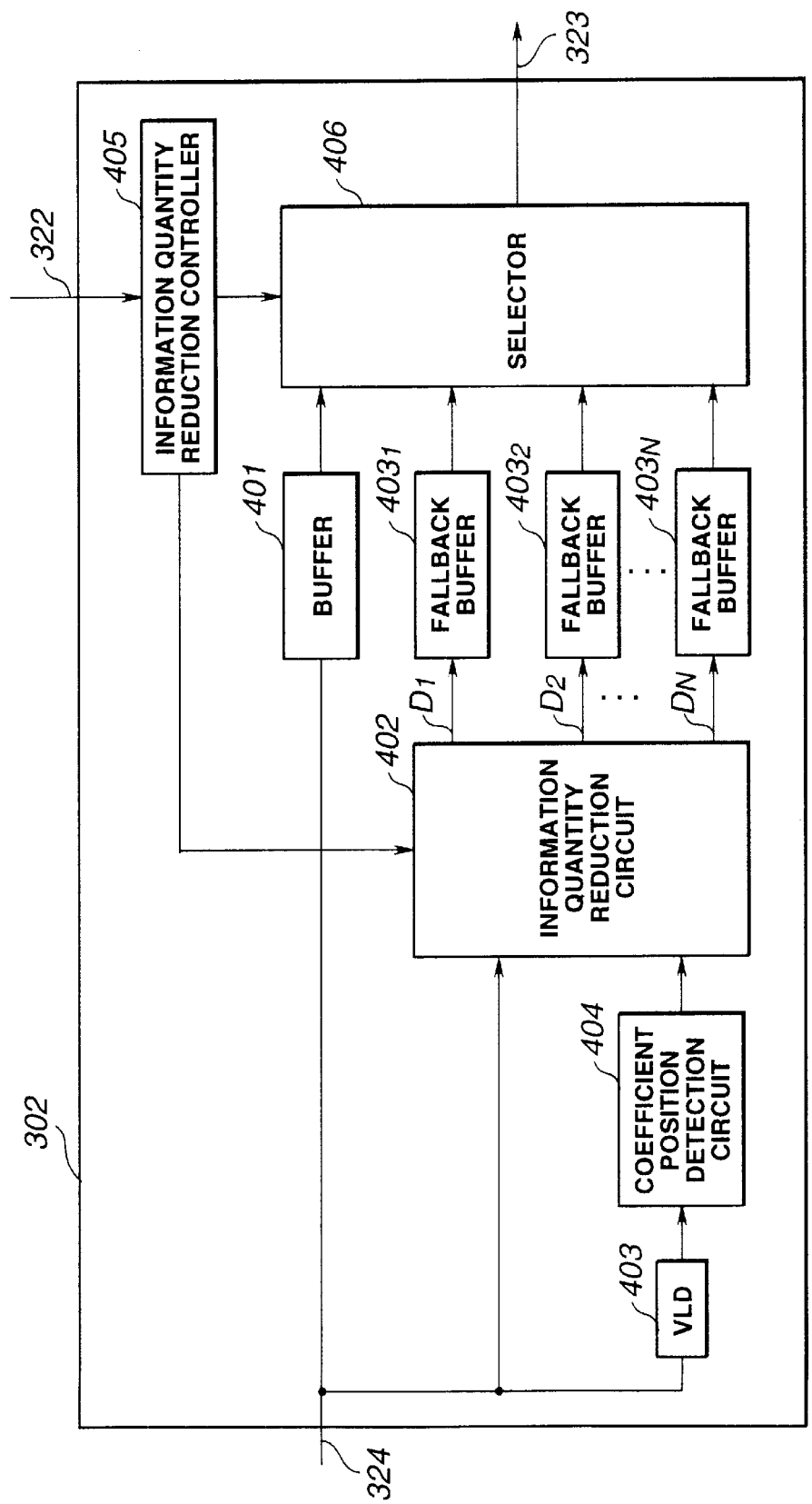
FIG. 15 is a detailed block diagram of a fallback buffer as an essential component of the third embodiment of the multiplexer according to the present invention.

As shown in FIG. 15, the fallback buffers supply a coded video data to a buffer 401, information quantity reducer 402 and a variable length decoder (VLD) 403. The VLD 403 makes a variable-length decoding of the coded video data to provide a DCT coefficient group data, and supplies the DCT coefficient group data to a coefficient position detection circuit 404. The coefficient position detection circuit 404 detects a DCT coefficient position from the DCT coefficient group data, and supplies it as a coefficient position data to the information quantity reducer 402. Based on the coefficient position data, the information quantity reducer 402 adds degrees "1" to "N" corresponding to DCT coefficient forming the coded video data in the transmission order.

The multiplexer comprises an information quantity reduction controller 405 which generates an information quantity reduction signal from an information quantity reduction control signal 322 supplied from the channel selection controller 313, and supplies it to the information quantity reducer 402. Based on the information quantity reduction signal, the information quantity reducer 402 cuts DCT coefficients of higher degrees than "1" from the coded video data to generate a reduced coded video data D1 for delivery to fallback buffers $403_1$.

Similarly, the information quantity reducer 402 cuts DCT coefficients of higher degrees than "2" from the coded video data under the information quantity reduction signal to generate a reduced coded video data D2, cuts DCT coefficients of higher degrees than "3" from the video data to generate a reduced coded video data D3, and similarly cuts DCT coefficients of higher degrees than "4" to "N" from the coded video data to generate reduced coded video data D4 to DN. The information quantity reducer 402 delivers the reduced coded video data D1 to DN to corresponding fallback buffers $403_2$ to $403_N$.

The buffer 401 provisionally stores the coded video data, and then deliver it to a selector 406 at a desired timing. The fallback buffers $403_1$ to $403_N$ provisionally store the reduced coded video data D1 to DN, and then deliver them to the selector 406 at a desired timing. In this case, the information quantity reduction controller 405 generates a read selection signal from an image read control signal supplied from the channel selection controller 313, and delivers it to the selector 406.

Based on the read selection signal, the selector 406 selects a one of the coded video data and reduced coded vide data D1 to DN that has a size conforming to a difference between the information quantity of an error correction code added by an error correction circuit provided downstream of the multiplexer, and the packet data quantity, and delivers it as a selected coded video data to a switch 314.

When for the PES stream of which the information quantity has been reduced as in the foregoing, channel selection is controlled using only the above-mentioned multiplex channel selection algorithm, there will be a likelihood that the T-STD buffers fail. For example, when a PES stream on a certain channel has the payload data partially cut, the increase of the data occupancy of fallback buffers is delayed and thus the multiplexing is delayed in comparison with a PES stream having not been subjected to such a bit manipulation. In this case, EB of the T-STD may possibly underflow. However, by simulating the data occupancy in the T-STD buffers in a virtual decoder buffer 321 and monitoring the change in data occupancy by the channel selection controller 313, multiple data on the channel can preferentially be selected when a possible underflow is detected, thus it is possible to prevent the T-STD buffers from failing.

The multiplexer shown in FIG. 14 is advantageously usable when, against an increase of transmission errors during rainfall, for example, it is necessary to limit the transmission bit rate of the multiplexer output being a payload data to a lower level than usual in place of a stronger error correction encoding than usual in the error correction encoding circuit following the multiplexer.

In the second and third embodiments of the present invention, the virtual decoder buffers 221 and 321 provided to simulate the write and read operations of the code buffers at the time of decoding may be replaced with a decoder buffer simulator 137 as in the variant of the first embodiment.

According to the present invention, the means having a virtual code buffer for the decoder and having the virtual code buffer operate as specified in MPEG2 or the like, or the means for virtually simulating the change of data occupancy in the code buffer for the decoder, are used to assure the normal operation of the decoder code buffer, thereby assuring a normal reproduction of a multiplexed output bit stream. Even if bit manipulations of a coded output are done inside the multiplexer for the removal of invalid data, cutting of payload data for improved capability of error correction, it is possible to assure the normal operation of the decoder buffer since the data is multiplexed after verification of the decoder buffer.

What is claimed is:

1. A data multiplexer for multiplexing a number n of coded stream data, comprising:

a number n of means for provisionally storing the number n of coded stream data;

a selection controlling means for retrieving a data occupancy in the number n of storage means to select any one of the storage means;

means for switching and delivering the coded stream data from the storage means selected by the selection controlling means;

an output means for multiplexing the switched output from the switching means; and a virtual storage means for simulating the write and read, for decoding, of the multiplexed bit stream from the output means into and from the code buffer.

2. The data multiplexer as set forth in claim 1, wherein the selection controlling means is controlled for selecting operation based on an information on data storage from the virtual storage means.

3. The data multiplexer as set forth in claim 1, wherein the switching means switches, under the control of the selection controlling means, the coded stream data from the number n of storage means as well as a control data concerning a program formed by the coded stream data, a data for padding voids in the bit stream and a header data of a packetized data.

4. The data multiplexer as set forth in claim 1, further comprising:

means for removing an invalid data from the coded stream data;

the number n of storage means provisionally storing the number n of coded stream data from which invalid data have been removed by the invalid data removing means.

5. The data multiplexer as set forth in claim 4, wherein the switching means switches, under the control of the selection controlling means, the coded stream data from the number n of storage means as well as a control data concerning a program formed by the coded stream data, a data for padding voids in the bit stream and a header data of a packetized data.

6. The data multiplexer as set forth in claim 1, further comprising:

means for cutting a less important data part from the coded stream data;

the number n of storage means provisionally the number n of coded stream data from which the less important data part has been cut by the data cutting means.

7. The data multiplexer as set forth in claim 6, further comprising:

means for removing an invalid data from the coded stream data;

the number n of storage means provisionally storing the number n of coded stream data from which invalid data have been removed by the invalid data removing means.

8. The data multiplexer for multiplexing a number n of coded stream data, comprising:

a number n of means for provisionally storing the number n of coded stream data;

a selection controlling means for retrieving a data occupancy in the number n of storage means to select any one of the storage means;

means for switching and delivering the coded stream data from the storage means selected by the selection controlling means;

an output means for multiplexing the switched output from the switching means; and means for simulating the write and read, for decoding, of the multiplexed bit stream from the output means into and from the code buffer.

9. The data multiplexer as set forth in claim 8, wherein the selection controlling means is controlled for selecting operation based on an information on data storage from the simulating means.

10. The data multiplexer as set forth in claim 8, wherein the switching means switches, under the control of the selection controlling means, the coded stream data from the number n of storage means as well as a control data concerning a program formed by the coded stream data, a data for padding voids in the bit stream and a header data of a packetized data.

11. The data multiplexer as set forth in claim 8, further comprising:

means for removing an invalid data from the coded stream data;

the number n of storage means provisionally storing the number n of coded stream data from which invalid data have been removed by the invalid data removing means.

12. The data multiplexer as set forth in claim 11, wherein the switching means switches, under the control of the selection controlling means, the coded stream data from the number n of storage means as well as a control data concerning a program formed by the coded stream data, a data for padding voids in the bit stream and a header data of a packetized data.

13. The data multiplexer as set forth in claim 8, further comprising:

means for cutting a less important data part from the coded stream data;

the number n of storage means provisionally the number n of coded stream data from which the less important data part has been cut by the data cutting means.

14. The data multiplexer as set forth in claim 13, further comprising:

means for removing an invalid data from the coded stream data;

the number n of storage means provisionally storing the number n of coded stream data from which invalid data have been removed by the invalid data removing means.

15. A data multiplexing method for multiplexing a number n of coded stream data, comprising the steps of:

retrieving the data occupancy in storage units which provisionally store the number n of means to select any one of the storage units;

switching the coded stream data from the selected storage unit to deliver a multiplexed data;

using the multiplexed data to form a multiplexed bit stream; and simulatively effecting the write and read, for decoding, of the multiplexed bit stream into and from the code buffer to control the selection of the storage units.

16. A data multiplexing method for multiplexing a number n of coded stream data, comprising the steps of:

retrieving the data occupancy in storage units which provisionally store the number n of means to select any one of the storage units;

switching the coded stream data from the selected storage unit to deliver a multiplexed data;

using the multiplexed data to form a multiplexed bit stream; and simulating the write and read, for decoding, of the multiplexed bit stream into and from the code buffer to control the selection of the storage units.

\* \* \* \* \*